(12) United States Patent
Albert

(10) Patent No.: US 10,688,737 B2
(45) Date of Patent: Jun. 23, 2020

(54) METHOD FOR FORMING FIBER-REINFORCED POLYMER COMPONENTS

(71) Applicant: General Electric Company, Schenectady, NY (US)

(72) Inventor: Bensely Albert, Greenville, SC (US)

(73) Assignee: General Electric Company, Schenectady, NY (US)

( * ) Notice: Subject to any disclaimer, the term of this patent is extended or adjusted under 35 U.S.C. 154(b) by 253 days.

(21) Appl. No.: 15/704,073

(22) Filed: Sep. 14, 2017

(65) Prior Publication Data

US 2019/0077096 A1 Mar. 14, 2019

(51) Int. Cl.
*B29C 70/54* (2006.01)
*B29C 64/165* (2017.01)
(Continued)

(52) U.S. Cl.
CPC .......... *B29C 70/543* (2013.01); *B29B 15/122* (2013.01); *B29C 35/0805* (2013.01); *B29C 64/165* (2017.08); *B29C 70/38* (2013.01); *B29C 70/382* (2013.01); *B29C 70/541* (2013.01); *B29D 99/0025* (2013.01); *B29D 99/0028* (2013.01); *B33Y 10/00* (2014.12); *B33Y 80/00* (2014.12); *B29B 15/125* (2013.01);
(Continued)

(58) Field of Classification Search
CPC ..... B29B 15/12; B29C 35/08; B29C 2035/08; B29C 70/16; B29C 70/205; B29C 70/20; B29C 70/52; B29C 70/50
See application file for complete search history.

(56) References Cited

U.S. PATENT DOCUMENTS 3,793,108 A * 2/1974 Goldsworthy ...... B29C 35/0261
156/180
4,861,621 A * 8/1989 Kanzaki .................. B29C 35/10
427/515
(Continued)

FOREIGN PATENT DOCUMENTS

WO 2014/045429 A1 3/2014
WO WO2015/105762 A1 7/2015
(Continued)

OTHER PUBLICATIONS

U.S. Appl. No. 15/460,564, filed Mar. 16, 2017.
(Continued)

*Primary Examiner* — Benjamin A Schiffman
(74) *Attorney, Agent, or Firm* — Dority & Manning, P.A.

(57) ABSTRACT

The present disclosure is directed to a method for forming a fiber-reinforced polymer component. The method includes impregnating a first fiber tow with a polymerizable liquid contained within a reservoir to form a first impregnated fiber tow. The method also includes positioning the first impregnated fiber tow within a build region of the reservoir. The build region has a shape and size corresponding to a cross-sectional shape of the fiber-reinforced polymer component. Furthermore, the method includes irradiating the build region of the reservoir to form a polymerized solid from the polymerizable liquid within the build region. The polymerized solid encases a portion of the first fiber tow to form at least a portion of the fiber-reinforced polymer component.

17 Claims, 8 Drawing Sheets

(51) Int. Cl.
- *B29C 35/08* (2006.01)
- *B29B 15/12* (2006.01)
- *B29C 70/38* (2006.01)
- *B29D 99/00* (2010.01)
- *B33Y 10/00* (2015.01)
- *B33Y 80/00* (2015.01)
- B33Y 30/00 (2015.01)
- B29K 105/00 (2006.01)
- B29L 31/08 (2006.01)
- B29C 70/16 (2006.01)

(52) U.S. Cl.
CPC ............ *B29C 70/16* (2013.01); *B29C 70/546* (2013.01); *B29C 2035/0827* (2013.01); *B29K 2105/0058* (2013.01); *B29L 2031/085* (2013.01); *B33Y 30/00* (2014.12)

(56) References Cited

U.S. PATENT DOCUMENTS

| | | | | |
|---|---|---|---|---|
| 4,892,764 | A * | 1/1990 | Drain | B29C 35/02 156/161 |
| 5,139,710 | A * | 8/1992 | Smith | B29B 15/122 264/103 |
| 5,633,042 | A * | 5/1997 | Nakamura | B29B 15/122 427/289 |
| 5,700,417 | A * | 12/1997 | Fernyhough | B29C 35/10 264/477 |
| 5,869,178 | A * | 2/1999 | Kusy | B29B 15/122 428/330 |
| 5,935,508 | A * | 8/1999 | Fernyhough | B29B 9/14 264/136 |
| 6,106,761 | A * | 8/2000 | Sjoberg | B29C 48/151 264/492 |
| 9,453,142 | B2 | 9/2016 | Rolland et al. | |
| 9,498,920 | B2 | 11/2016 | DeSimone et al. | |
| 2002/0056782 | A1 | 5/2002 | Gabrys | |
| 2005/0064184 | A1 | 3/2005 | Bull | |
| 2008/0159871 | A1 | 7/2008 | Bech | |
| 2011/0088841 | A1 * | 4/2011 | Thunhorst | B29C 39/148 156/307.5 |
| 2015/0204075 | A1 * | 7/2015 | Tsukamoto | B29C 35/0805 52/309.1 |
| 2016/0046072 | A1 | 2/2016 | Rolland et al. | |
| 2016/0046075 | A1 | 2/2016 | DeSimone et al. | |
| 2016/0193786 | A1 | 7/2016 | Moore et al. | |
| 2016/0200052 | A1 | 7/2016 | Moore et al. | |
| 2016/0229123 | A1 | 8/2016 | Carlson et al. | |
| 2016/0263838 | A1 | 9/2016 | Goldman et al. | |
| 2016/0297105 | A1 * | 10/2016 | Moireau | C03C 25/26 |
| 2016/0303793 | A1 | 10/2016 | Ermoshkin et al. | |
| 2016/0325493 | A1 | 11/2016 | DeSimone et al. | |
| 2017/0028618 | A1 | 2/2017 | Robeson et al. | |
| 2017/0028638 | A1 * | 2/2017 | Evans | B29C 70/382 |
| 2017/0066185 | A1 | 3/2017 | Ermoshkin et al. | |
| 2017/0100885 | A1 | 4/2017 | DeSimone et al. | |
| 2017/0113415 | A1 | 4/2017 | DeSimone et al. | |
| 2017/0113416 | A1 | 4/2017 | DeSimone et al. | |
| 2017/0173871 | A1 | 6/2017 | Ermoshkin et al. | |
| 2017/0173880 | A1 | 6/2017 | DeSimone et al. | |
| 2017/0210077 | A1 | 7/2017 | Ermoshkin et al. | |
| 2018/0163007 | A1 * | 6/2018 | Okamoto | B29B 15/122 |
| 2018/0207870 | A1 * | 7/2018 | Tyler | B29C 70/382 |
| 2018/0370129 | A1 * | 12/2018 | Natale | B29C 70/382 |

FOREIGN PATENT DOCUMENTS

| | | |
|---|---|---|
| WO | WO2016/109550 A1 | 7/2016 |
| WO | WO2016/112090 A1 | 7/2016 |
| WO | WO2016/123499 A1 | 8/2016 |
| WO | WO2016/123506 A1 | 8/2016 |
| WO | WO2016/126796 A2 | 8/2016 |
| WO | WO2016/133759 A1 | 8/2016 |
| WO | WO2016/140886 A1 | 9/2016 |
| WO | WO2016/140888 A1 | 9/2016 |
| WO | WO2016/140891 A1 | 9/2016 |
| WO | WO2016/145050 A1 | 9/2016 |
| WO | WO2016/145182 A1 | 9/2016 |
| WO | WO2016/149097 A1 | 9/2016 |
| WO | WO2016/149104 A1 | 9/2016 |
| WO | WO2016/149151 A1 | 9/2016 |
| WO | WO2017/0408900 A1 | 3/2017 |

OTHER PUBLICATIONS

Luca, D. V., "Design and Manufacture of Optimized Continuous Composite Fiber Filament Using Additive Manufacturing Systems," Journal of Material Sciences & Engineering, vol. 6, Issue 4, pp. 1-5 (Aug. 2017).

International Search Report and Written Opinion issued in connection with corresponding PCT Application No. PCT/US18/47528 dated Dec. 7, 2018.

* cited by examiner

METHOD FOR FORMING FIBER-REINFORCED POLYMER COMPONENTS

FIELD

The present disclosure generally relates to fiber-reinforced polymer components. More particularly, the present disclosure relates to methods and systems for forming fiber-reinforced polymer components, such as for use in wind turbines.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

Certain components of the wind turbine, such as shear webs or other parts of the rotor blades, may have complex geometries best formed using a suitable additive manufacturing process. In many such additive manufacturing processes, volumes of liquefied thermoplastic are deposited at various desired locations to form a layer of the component. Once this layer solidifies, additional liquefied thermoplastic is deposited at various locations on that layer to form a subsequent layer. This process is repeated until the complete component is formed. Reinforcing fibers may be added as needed. However, additive manufacturing processes of this type are generally time-consuming and require long cycle times.

Recently, continuous additive manufacturing processes have been developed where each layer is formed simultaneously. These continuous additive manufacturing processes generally require much shorter cycle times that the additive manufacturing processes where material is deposited one drop at a time. However, current continuous additive manufacturing processes are unable to incorporate reinforcing fibers necessary to form fiber-reinforced polymer components, such as those used in wind turbines.

Accordingly, an improved method and system for continuously forming fiber-reinforced polymer components would be welcomed in the art.

BRIEF DESCRIPTION

Aspects and advantages of the technology will be set forth in part in the following description, or may be obvious from the description, or may be learned through practice of the technology.

In one aspect, the present disclosure is directed to a method for forming a fiber-reinforced polymer component. The method includes impregnating a first fiber tow with a polymerizable liquid contained within a reservoir to form a first impregnated fiber tow. The method also includes positioning the first impregnated fiber tow within a build region of the reservoir. The build region has a shape and size corresponding to a cross-sectional shape of the fiber-reinforced polymer component. Furthermore, the method includes irradiating the build region of the reservoir to form a polymerized solid from the polymerizable liquid within the build region. The polymerized solid encases a portion of the first fiber tow to form at least a portion of the fiber-reinforced polymer component.

In another aspect, the present disclosure is directed to a method for forming a lattice portion of a continuous fiber-reinforced polymeric wind turbine component. The method includes impregnating first and second fiber tows with a polymerizable liquid contained within a reservoir to form first and second impregnated fiber tows. The method also includes positioning the first and second impregnated fiber tows within a build region of the reservoir, with the first fiber tow being positioned at a different location within the build region than the second fiber tow. The build region has a shape and size corresponding to a cross-section of the lattice portion of the fiber-reinforced polymeric wind turbine component. The method further includes irradiating the build region of the reservoir to form a polymerized solid from the polymerizable liquid within the build region. The polymerized solid is coupled to a build plate and encases a portion of the first and second fiber tows to form at least a portion of the lattice portion of the fiber-reinforced polymeric wind turbine component. Additionally, the method includes continuously moving the build plate away from the build region when the build region is irradiated. Furthermore, the method includes adjusting at least one of a shape or a size of the build region when the cross-section of the lattice portion of the fiber-reinforced polymeric wind turbine being forced changes.

In a further aspect, the present disclosure is directed to a system for forming a fiber-reinforced polymer component. The system includes a reservoir containing a polymerizable liquid. The reservoir includes a build region having a shape and size corresponding to a cross-section of the fiber-reinforced polymer component. The reservoir further includes a dead zone being positioned between a bottom wall of the reservoir and the build region. The dead zone contains oxygen for preventing polymerization of the polymerizable liquid. The system also includes a mirror configured to direct radiation into the build region of the reservoir. The radiation forms a polymerized solid from the polymerizable liquid within the build region. The system further includes a guide tool positioned within the dead zone of the reservoir. The guide tool is configured to position an impregnated fiber tow within the build region of the reservoir. Additionally, the system includes a controller communicatively coupled to the mirror and the guide tool. The controller is configured to control the guide tool to position the impregnated fiber tow within the build region of the reservoir. The controller is further configured to control the mirror to irradiate the build region of the reservoir.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
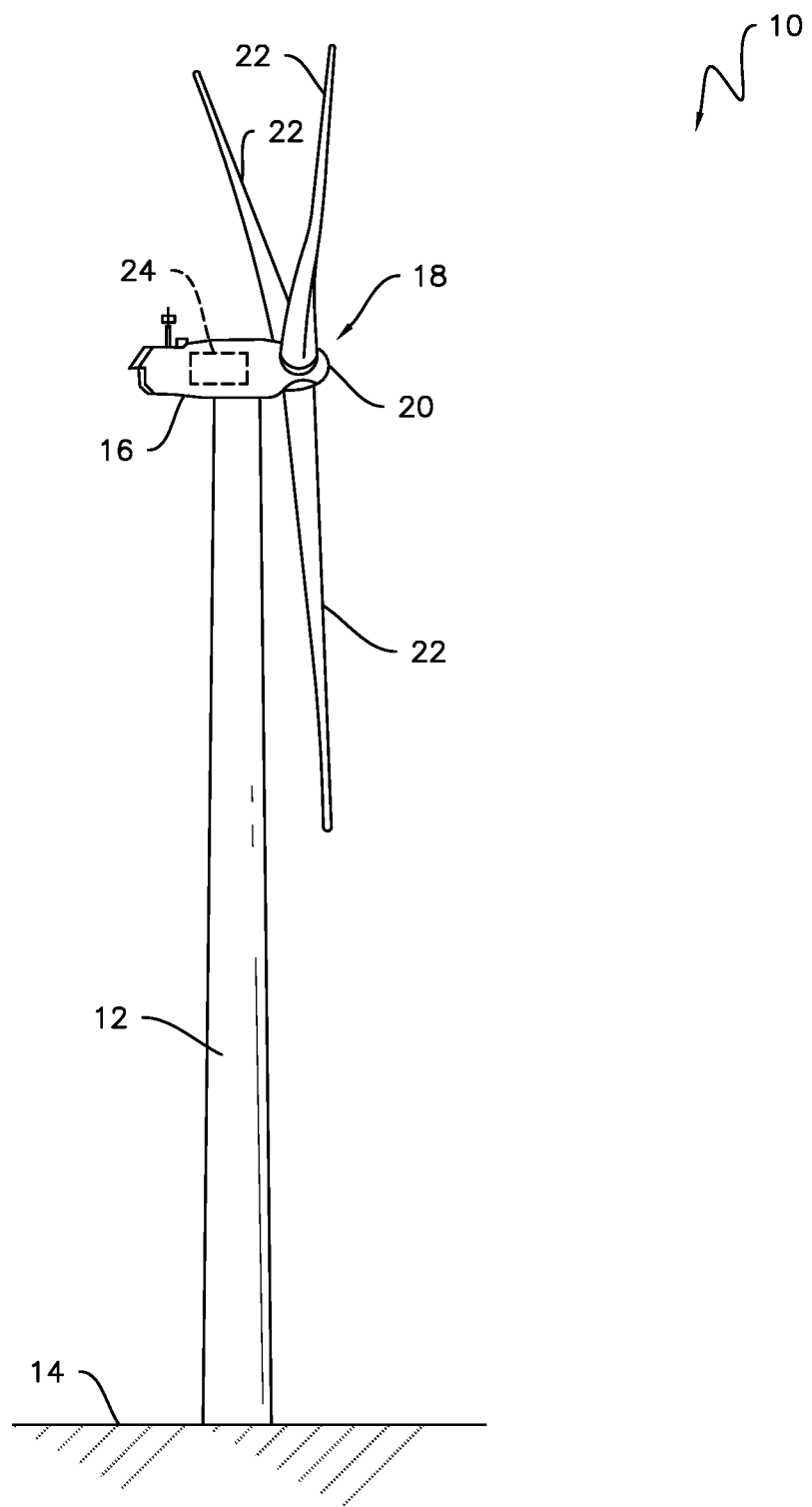
FIG. 1 is a perspective view of an exemplary wind turbine in accordance with aspects of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 illustrates a perspective view of one embodiment of an exemplary wind turbine 10 in accordance with the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotating the rotor 18 to convert kinetic energy from the wind into usable mechanical energy, and subsequently, electrical energy. For instance, the hub 20 may be rotatably coupled to an electric generator 24 positioned within the nacelle 16.

Figure 2:
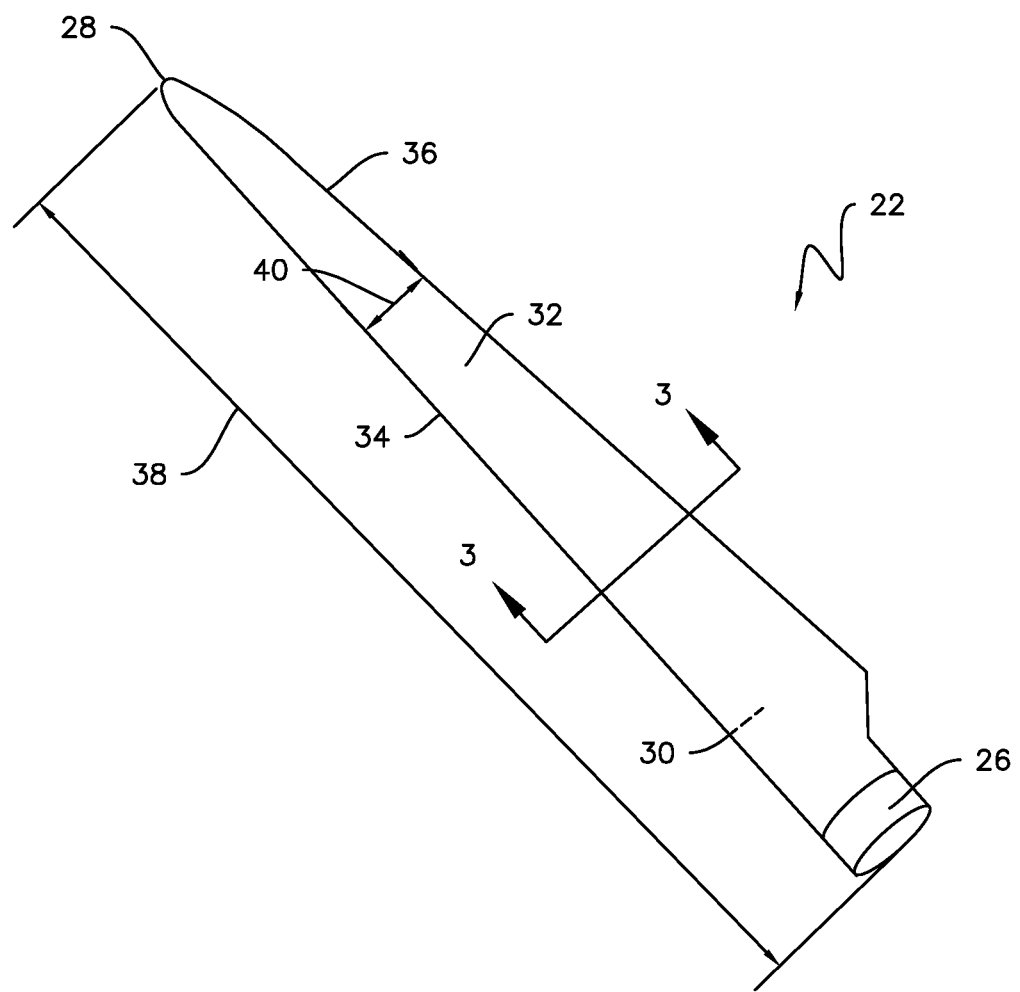
FIG. 2 is a perspective view of an exemplary rotor blade in accordance with aspects of the present disclosure.

FIG. 2 is a perspective view of one of the rotor blades 22. As shown, the rotor blade 22 includes a blade root 26 that couples to the rotatable hub 20 (FIG. 1) and a blade tip 28 disposed opposite the blade root 26. The rotor blade 22 may also include a pressure side 30 and a suction side 32 extending between a leading edge 34 and a trailing edge 36. Additionally, the rotor blade 22 may include a span 38 defining the total length between the blade root 26 and the blade tip 28 and a chord 40 defining the total length between the leading edge 34 and the trailing edge 36. In general, the chord 40 may vary in length along the span 38 as the rotor blade 22 extends from the blade root 26 to the blade tip 28.

Figure 3:
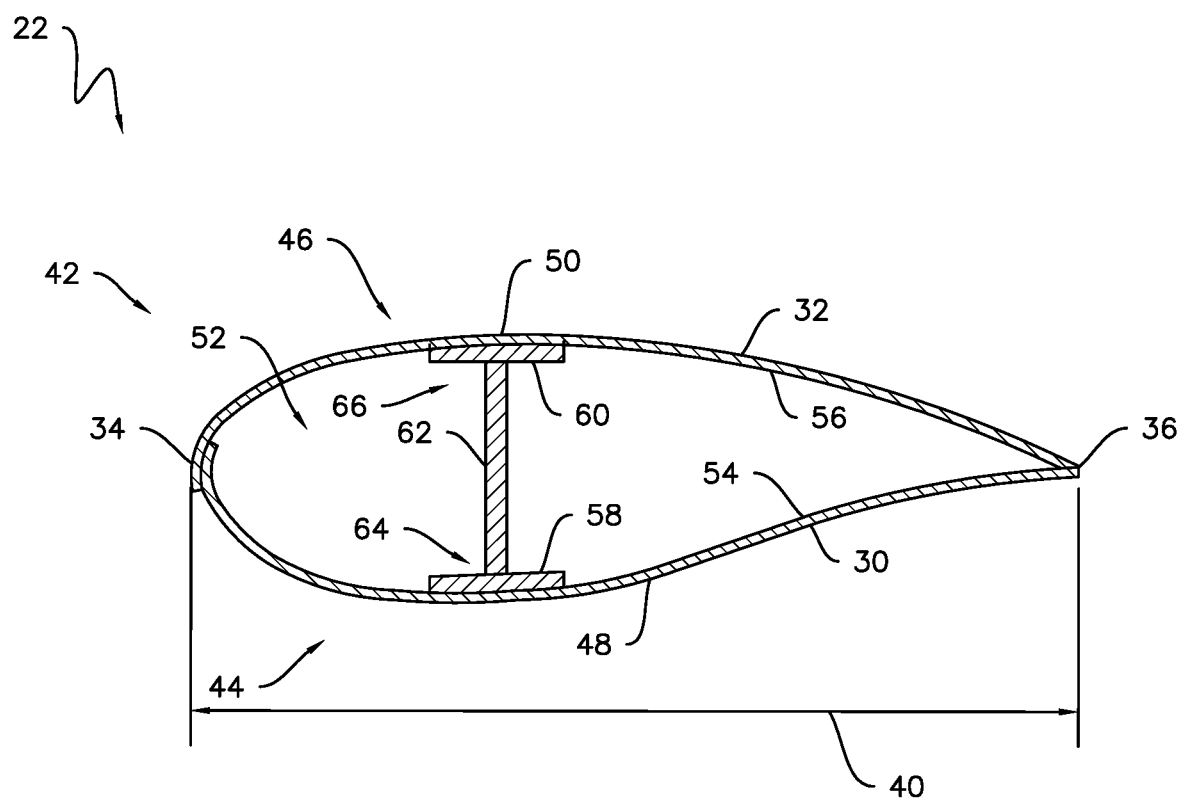
FIG. 3 is a cross-sectional view of the rotor blade taken generally about line 3-3 shown in FIG. 2, illustrating a shear web positioned within the rotor blade in accordance with aspects of the present disclosure.

Referring now to FIG. 3, the rotor blade 22 is formed from a shell 42. In some embodiments, the shell 42 includes a first shell portion 44 and a second shell portion 46 coupled (e.g., adhesively coupled) at or proximate to the leading edge 34 and the trailing edge 36 of the rotor blade 22. In this respect, the first and second shell portions 44, 46 may extend along the entire span 38 and/or the entire chord 40. In alternate embodiments, however, the shell 42 may include more or fewer shell portions and/or the shell portions may be joined at different positions on the rotor blade 22. Furthermore, each shell portion may in some embodiments extend for only a portion of the span 38 and/or the chord 40.

As shown in FIG. 3, the shell 42 includes exterior surfaces defining the various sides and edges of the rotor blade 22. More specifically, the first shell portion 44 includes an exterior surface 48 that defines the pressure side 30 of the rotor blade 22. The second shell portion 46 includes an exterior surface 50 that defines the suction side 32 of the rotor blade 22. In the embodiment shown in FIG. 3, the first and second shell portions 44, 46 couple together such that the second shell portion 46 defines the leading edge 34 and/or the first shell portion 44 defines the trailing edge 36. In alternate embodiments, however, the first shell portion 44 may define the leading edge 34, and the second shell portion 46 may define the trailing edge 36. In further embodiments, the first and second shell portions 44, 46 may both define the leading edge 34 and the trailing edge 36.

The shell 42 defines an interior cavity 52 therein. That is, the rotor blade 22 is generally hollow. In the embodiment shown in FIG. 3, the first shell portion 44 defines an interior surface 54 and the second shell portion 46 defines an interior surface 56. In this respect, the interior surfaces 54, 56 of the first and second shell portions 44, 46 circumscribe the interior cavity 52. Various structural components positioned in the interior cavity 52, which will be discussed in greater detail below, may divide the interior cavity 52 into various compartments.

In the embodiment shown in FIG. 3, the rotor blade 22 includes spar caps 58, 60 positioned in the interior cavity 52. In particular, a first spar cap 58 couples (e.g., adhesively) to the interior surface 54 of the first shell portion 44. A second spar cap 60 couples (e.g., adhesively) to the interior surface 56 of the second shell portion 46. In this respect, the first and second spar caps 58, 60 may generally resist bending stresses and/or other loads acting on the rotor blade 22 in a span-wise direction (i.e., a direction parallel to the span 38 of the rotor blade 22) during operation of a wind turbine 10. Furthermore, the first and second spar caps 58, 60 may resist span-wise compression of the rotor blade 22 occurring during operation of the wind turbine 10. The first and second spar caps 58, 60 may extend along the span 38 from the blade root 26 to the blade tip 28 or a portion thereof. Some embodiments of the rotor blade 22 may include zero, one, three, four, or more spar caps.

The rotor blade 22 further includes one or more shear webs 62 extending through the interior cavity 52 in the span-wise direction. In some embodiments, the shear webs 62 may be formed used system 100 and/or method 200 described below. Each shear web 62 includes a first side 64 that couples to the first shell portion 44 and a second side 66 that couples to the second shell portion 46. In this respect, the shear webs 62 resist shear forces exerted on the first and second shell portions 44, 46. In the embodiment shown in FIG. 3, rotor blade 22 includes one shear web 62 directed connected (e.g., bonded) to first and second spar caps 58, 60. In alternate embodiments, however, the rotor blade 22 may include more shear webs 62 and/or the shear webs 62 may be directly connected (e.g., bonded) to the interior surfaces 54, 56 of the first and second shell portions 44, 46. In further embodiments, the shear webs 62 may extend in the chord-wise direction (i.e., a direction parallel to the chord 38 of the rotor blade 22).

Figure 4:
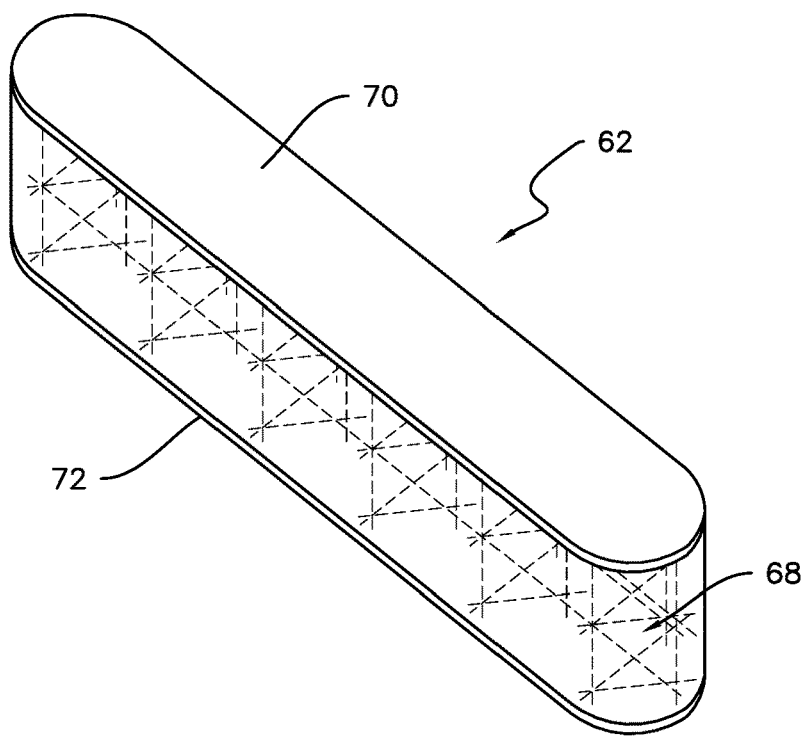
FIG. 4 is a perspective view of one embodiment of a shear web in accordance with aspects of the present disclosure.

FIG. 4 illustrates one embodiment of the shear web 62. As shown, the shear web 62 may include a lattice structure 68 positioned between a first face plate 70 and a second face 72. In one embodiment, the lattice structure 68 and the face plates 70, 72 may be formed as an integral structure. However, in alternative embodiments, the lattice structure 68 and the face plates 70, 72 may be separate components that are adhesively coupled together to form the shear web 62. Although, the shear web 62 may have any suitable configuration.

Figure 5:
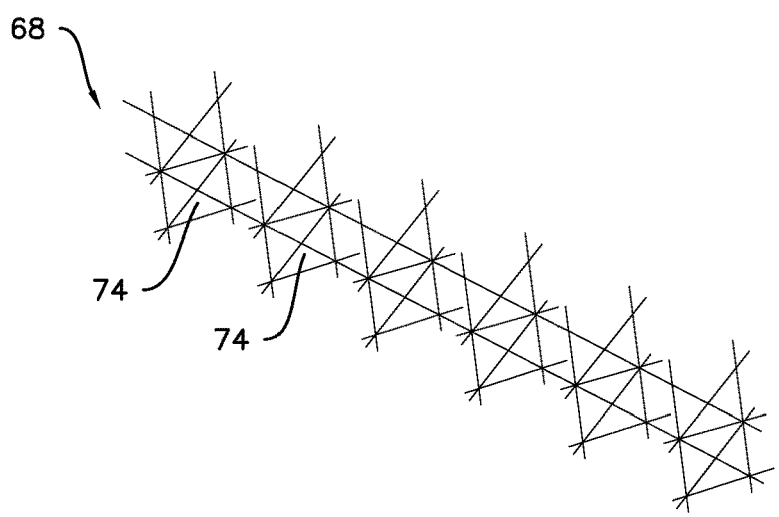
FIG. 5 is a perspective view of one embodiment of an internal lattice structure of a shear web in accordance with aspects of the present disclosure.

FIG. 5 illustrates the lattice structure 68 in greater detail. More specifically, the lattice structure 68 may define a plurality of open cells 74, which provide a lightweight construction for the shear web 62. The cells 74 may have any suitable shape and/or configuration. Furthermore, the lattice structure 68 may be integrally formed as a single component or formed as a plurality of lattice structure portions that are coupled together. Although the lattice structure 68 is shown as being a portion of the shear web 62, the lattice structure 68 may be integrated into any component of the wind turbine 10, such as the first and second shell portions 44, 46.

Figure 6:
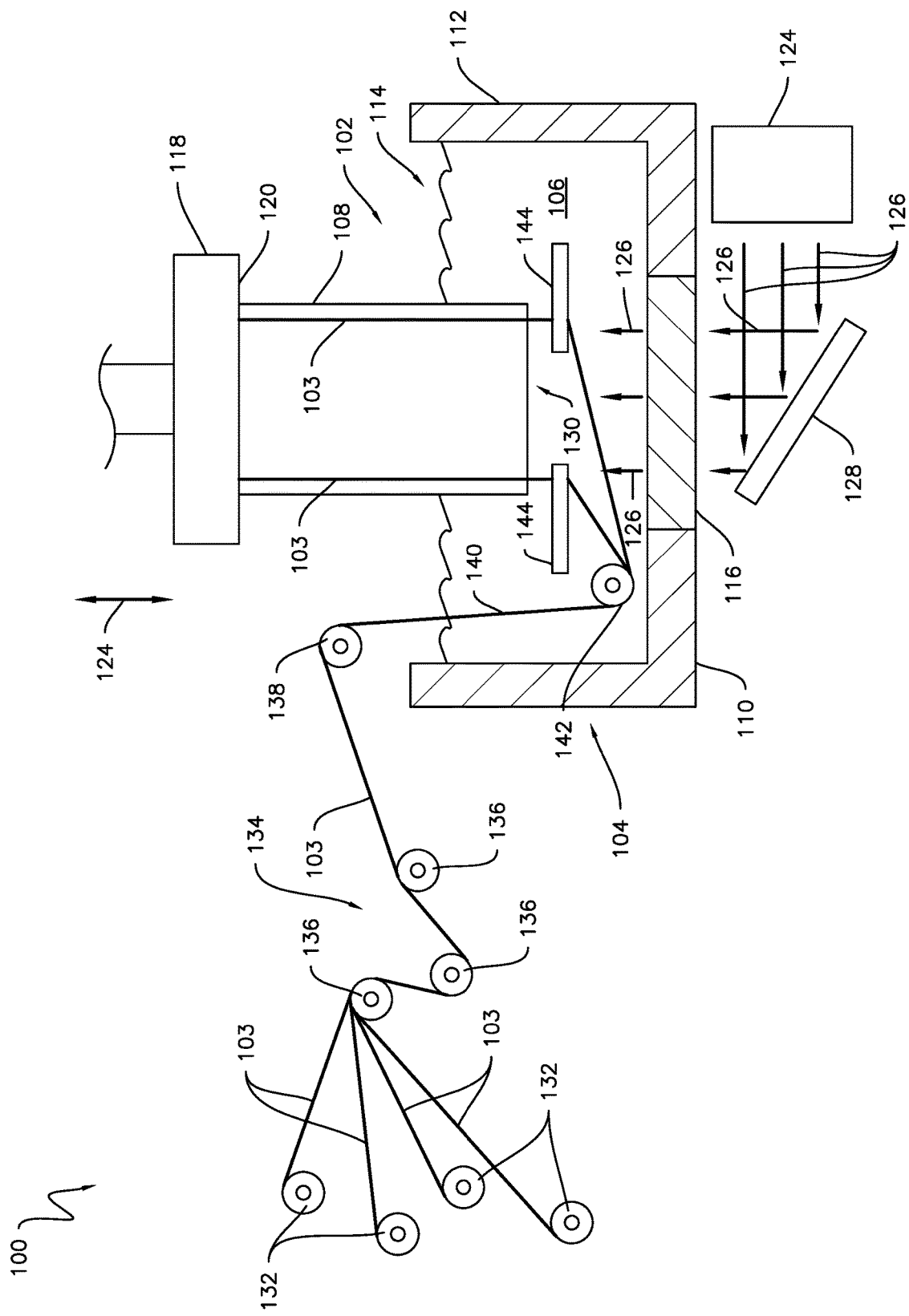
FIG. 6 is a schematic view of one embodiment of a system for forming a fiber-reinforced polymer component in accordance with aspects of the present disclosure.

FIG. 6 illustrates one embodiment of a system 100 for forming a fiber-reinforced polymer component 102. In general, the fiber-reinforced polymer component 102 includes one or more fiber tows 103 encased or embedded within a polymerized solid 108. In some embodiments, for example, the fiber-reinforced polymer component 102 may be a component of the wind turbine 10, such as one or more of the shear web 62. In alternative embodiments, however, the fiber-reinforced polymer component 102 may be one of or a portion of the spar caps 58, 60, the first shell portion 48, the second shell portion 46, the blade root 26, and/or any other suitable component of the wind turbine 10. In further embodiments, the fiber-reinforced polymer component 102 may be any suitable fiber-reinforced polymer component for use in any suitable application, including applications outside of wind turbines.

As shown, the system 100 includes a reservoir 104 containing a polymerizable liquid 106. As will be described in greater detail below, a portion of the polymerizable liquid 106 is irradiated to form a polymerized solid 108, which at least partially defines the fiber-reinforced polymer component 102. In several embodiments, the reservoir 104 may include a bottom wall 110 and a side wall 112, which collectively define a chamber 114 for holding the polymerizable liquid 106. The top of the reservoir 104 may be open to permit continuous removal of the polymerized solid 108 from the reservoir 104 during formation of the fiber-reinforced polymer component 102. Furthermore, the reservoir 104 may include an oxygen-permeable portion 116 positioned within the bottom wall 108. The oxygen-permeable portion 116 supplies oxygen to a portion of the polymerizable liquid 106 within the reservoir 104. As such, the oxygen-permeable portion 116 may be formed from silicone or another suitable oxygen-permeable material. Nevertheless, the reservoir 104 may have any suitable configuration in other embodiments.

In certain embodiments, the polymerizable liquid 106 may be any suitable liquefied thermoplastic material. As used herein, the term "thermoplastic material" generally encompasses any plastic material or polymer that is reversible in nature. For example, thermoplastic materials typically become pliable or moldable when heated to a certain temperature and returns to a more rigid state upon cooling. Furthermore, thermoplastic materials may include amorphous thermoplastic materials and/or semi-crystalline thermoplastic materials. For example, some amorphous thermoplastic materials may generally include styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. In alternate embodiments, the polymerizable liquid 106 may be any UV-curing or photo-curing resin, including suitable thermoset materials.

The system 100 also includes a build plate 118 having a build surface 120 upon which the fiber-reinforced polymer component 102 is formed. As shown, during formation of the fiber-reinforced polymer component 102, the polymerized solid 108 is coupled to the build plate 118 and extends from the build surface 120 into the polymerizable liquid 106 contained within the reservoir 104. The build plate 118 may be moveable relative to the reservoir 104 to facilitate removal of the polymerized solid 108 from the reservoir 104. Specifically, a suitable actuator (not shown) may move the build plate 116 toward and away from the bottom wall 108 of the reservoir 104 (e.g., as indicated by arrow 122 in FIG. 6). In some embodiments, the actuator may move the build plate 118 at a constant or substantially constant speed relative to the reservoir 104.

The system 100 further includes a radiation source 124 configured for emitting radiation (e.g., as indicated by arrows 126 in FIG. 6) to irradiating a portion of the polymerizable liquid 106 contained the reservoir 104 to form the polymerized solid 108. More specifically, the radiation source 124 may emit radiation 126 suitable for polymerizing or otherwise solidifying the polymerizable liquid 106 within the reservoir 104 to form the polymerized solid 108. For example, in some embodiments, the radiation 126 may be ultraviolet radiation. In such embodiments, the radiation source 124 may be a black light, a short-wave ultraviolet lamp, a gas-discharge lamp, an ultraviolet LED, an ultraviolet laser, or any other suitable source for emitting ultraviolet radiation. In alternative embodiments, however, the radiation 126 may be any suitable type of radiation and/or the radiation source 124 may be any suitable type of radiation source.

Furthermore, the system 100 may include a mirror 128 configured for directing the radiation 126 emitted by the radiation source 124 into a build region 130 of the reservoir 104. In general, the build region 130 is the portion of the reservoir 104 irradiated with the radiation 126. More specifically, when irradiated with the radiation 126, the polymerizable liquid 106 within the build region 130 forms a portion of the polymerized solid 108 having the same shape and size as the build region 130. In this respect, the build region 130 of the reservoir 104 has a shape and size corresponding to a cross-section of the portion of the fiber-reinforced polymer component 102 currently being formed. As such, the build region 130 may define a single, closed shape, such as the generally annular profile shown in FIG. 8, or several separate shape, such as a cross-section of the lattice structure 68 (FIG. 4). As will be described in greater detail below, the mirror 128 may adjust the shape, size, and/or position of the build region 130 in response to changes in the cross-section of the portion of the fiber-reinforced polymer component 102 currently being formed. Accordingly, in some embodiments, the mirror 128 may be a digital micromirror device (DMD) chip. Nevertheless, the mirror 128 may be any suitable device for directing the radiation 124 into the reservoir 104 in other embodiments. Furthermore, as shown, the mirror 128 may direct the radiation 126 through the bottom wall 110 of the reservoir 104, such as through the oxygen-permeable portion 116. Although, the mirror 128 may direct the radiation 126 through any suitable wall or portion of the reservoir 104.

Referring still to FIG. 6, the system 100 may include suitable components for providing the one or more fiber tows 103 to the reservoir 104 for impregnation with the polymerizable liquid 106. After impregnation, the fiber tows 103 are positioned within the build region 130 for encasing or embedding into the polymerized solid 108 during irradiation as will be described below. As shown, the system 100 may include one or more spindles 132 from which the fiber tows 103 are unwound. The fiber tows 103 may then pass through a tensioner assembly 134 having one or more tensioner pulleys 136, which apply tension to each fiber tow 103 to prevent any slack therein. An idler pulley 138 directs each fiber tow 103 into the reservoir 104. As such, the fiber tows 132 are submerged in the polymerizable liquid 106 to form impregnated fiber tows 140. A static guide directional device 142 directs each impregnated fiber tow 140 towards the build region 130 for embedding or encasing within the polymerized solid 108. As shown, one end of each fiber tow 103 may be coupled to the build plate 118. In this respect, when the build plate 118 and the polymerized solid 108 move away from the bottom wall 110 of the reservoir 104, the build plate 118 and/or the polymerized solid 108 unwind the fiber tows 103 from the spindles 134, thereby pulling the fiber tows 103 through the various pulleys 136, 138, 142 and into the reservoir 104 for impregnation. Although FIG. 6 illustrates four fiber tows 103, more or fewer fiber tows 103 may be impregnated for eventual encasing or embedding within the polymerized solid 108 to form the fiber-reinforced polymer component 102. Furthermore, any suitable component or combination of components may provide the fiber tows 103 to the reservoir 104 for impregnation. Moreover, the components providing the fiber tows 103 to the reservoir 104 for impregnation may be static devices (e.g., sleeves through the fiber tows 103 are pulled such that the fiber tows 103 change direction) or a dynamic devices (e.g., pulleys). For example, in one embodiment, static devices may guide the fiber tows 103 when submerged within the polymerizable liquid 106, while dynamic devices may guide the fiber tows 103 when not submerged within the polymerizable liquid 106.

In general, the fiber tows 103 may include a plurality of individual continuous fibers. For example, in some embodiments, the fiber tows may include a plurality of continuous carbon fibers or continuous glass fibers. Nevertheless, the fiber tows 103 may include a plurality polymer fibers, wood fibers, bamboo fibers, ceramic fibers, nanofibers, metal fibers, or other similar fibers or suitable combinations thereof.

Referring now to FIGS. 4-6, the system 100 may include one or more guide tools 144 configured for positioning the impregnated fiber tows 140 within the build region 130 of the reservoir 104. As mentioned above, the shape, size, and/or position of the build region 130 relative to the build plate 118 may change in response to a change in the cross-section of the fiber-reinforced polymer component 102. In this respect, the guide tools 144 may adjust the position of the impregnated fiber tows 140 relative to the build plate 130 such that the impregnated fiber tows 140 remain within the build region 130 of the reservoir 104 as the cross-section of the fiber-reinforced polymer component 102 changes. In the illustrated embodiment, the system 100 includes four guide tools 144. As such, the system 100 may include one guide tool 144 for each impregnated fiber tows 140. Nevertheless, in alternative embodiments, the system 100 may include any suitable number of guide tools 144. For example, the system 100 may include a number of guide tools 144 such that the guide tools 144 are positioned close together to position the fiber tows 103 close together.

Figure 7:
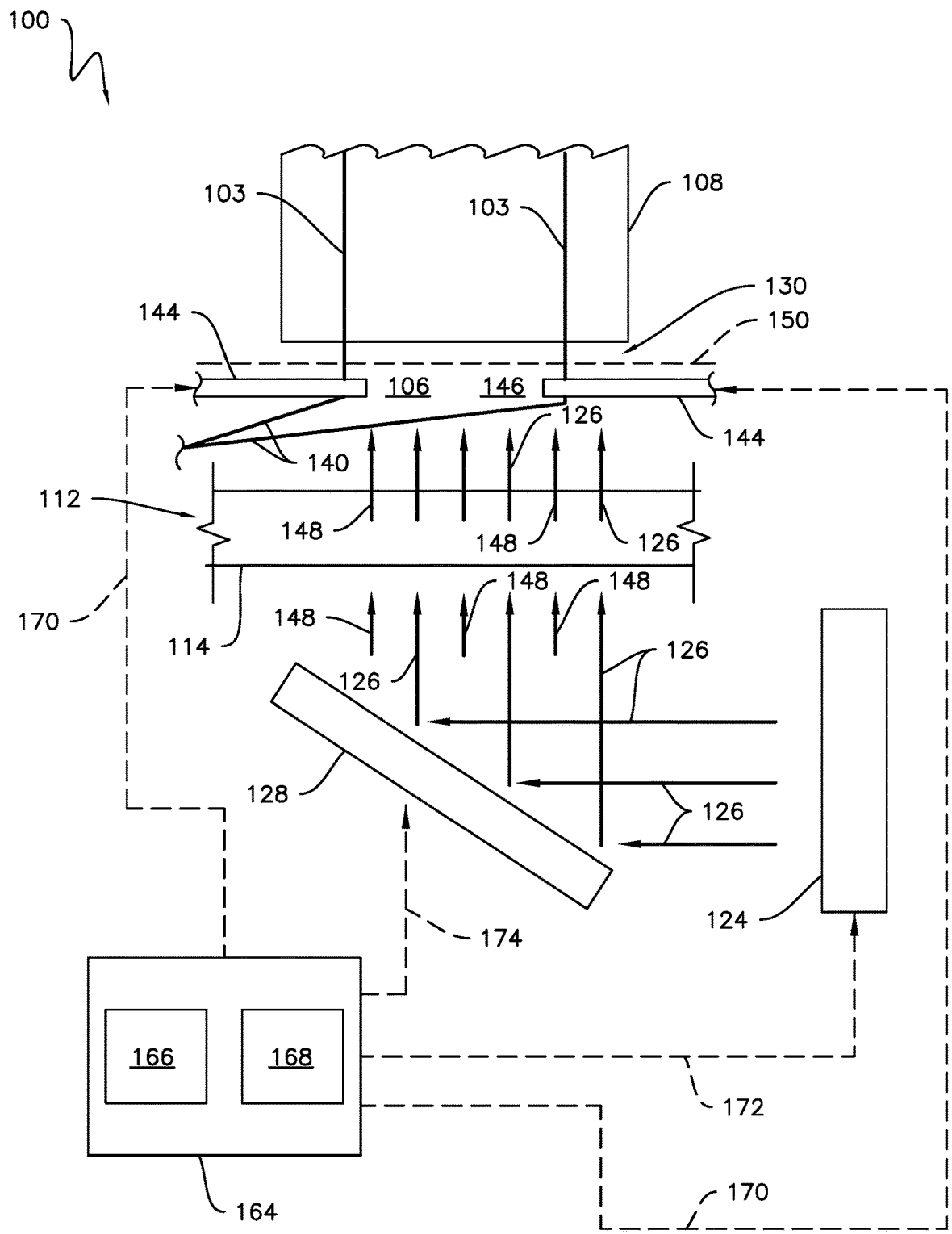
FIG. 7 is an enlarged schematic view of a portion of the system for forming a fiber-reinforced polymer component shown in FIG. 4, illustrating a build region and a dead zone within a reservoir filled with a polymerizable liquid.

As best illustrated in FIG. 7, the guide tools 144 may be positioned within the reservoir 104 between the build region 130 and the bottom wall 110. For example, in the guide tools 144 may be positioned within a dead zone 146 of the reservoir 104 located between the build region 130 and the bottom wall 110. As mentioned above, the oxygen-permeable portion 116 of the reservoir 104 supplies oxygen (e.g., as indicated by the arrows 148 in FIG. 7) to a portion of the polymerizable liquid 116. In general, the portion of the polymerizable liquid 116 containing the oxygen 148 is referred to as the dead zone 146 and is positioned between the build region 130 and the bottom wall 110 of the reservoir 104. For the purposes of illustration, dashed line 150 in FIG. 7 demarcates the dead zone 146 and the build region 130. The oxygen 148 in the dead zone 146 prevents the polymerizable liquid 106 from polymerizing or otherwise solidifying when the radiation 126 passes therethrough. As such, positioning of the guide tools 144 within the dead zone 146 prevents the polymerizable liquid 106 in the dead zone 146 from solidifying on the guide tools 144. Furthermore, the dead zone 146 prevents the polymerizable liquid 106 therein from solidifying on the bottom wall 110 of the reservoir 104 and preventing movement of polymerized solid 108 relative to the bottom wall 110. The oxygen 148 does not permeate into the build region 130 and prevent polymerization therein.

Figure 8:
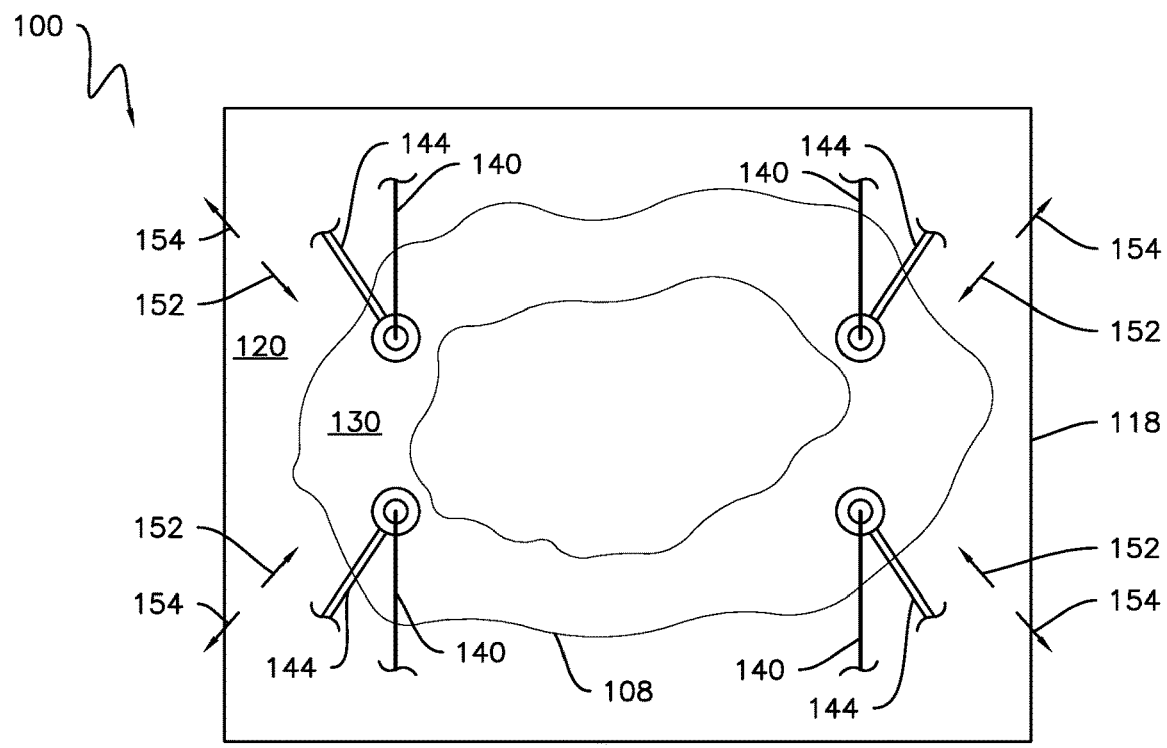
FIG. 8 is a bottom view of a polymerized solid in accordance with aspects of the present disclosure, illustrating a plurality of guide tools configured to position a plurality of fiber tows within a build region.

As mentioned above, the guide tools 144 may adjust the position of the impregnated fiber tows 140 relative to the build plate 118. In some embodiments, as shown in FIG. 8, the guide tools 144 may adjust the impregnated fiber tows 140 toward the center of the build plate 118 (e.g., as indicated by arrows 152 in FIG. 7) and away from the center of the build plate 118 (e.g., as indicated by arrows 154 in FIG. 7). In such embodiments, as the cross-section of the fiber-reinforced polymer component 102 narrows, the guide tools 144 may move the impregnated fiber tows 140 in the direction 152. Conversely, as the cross-section of the fiber-reinforced polymer component 102 widens, the guide tools 144 may move the impregnated fiber tows 140 in the direction 154. In general, the various impregnated fiber tows 140 are positioned within different locations in the build region 130. In some embodiments, the guide tools 144 are positioned around the entire perimeter of the fiber-reinforced polymer component 102, such as around 360 degrees around the component 102. In alternative embodiments, however, the guide tools 144 may move the impregnated fiber tows 140 in any suitable direction such that impregnated fiber tows 140 remain within the build region 130 during formation of the fiber-reinforced polymer component 102.

Figure 9:
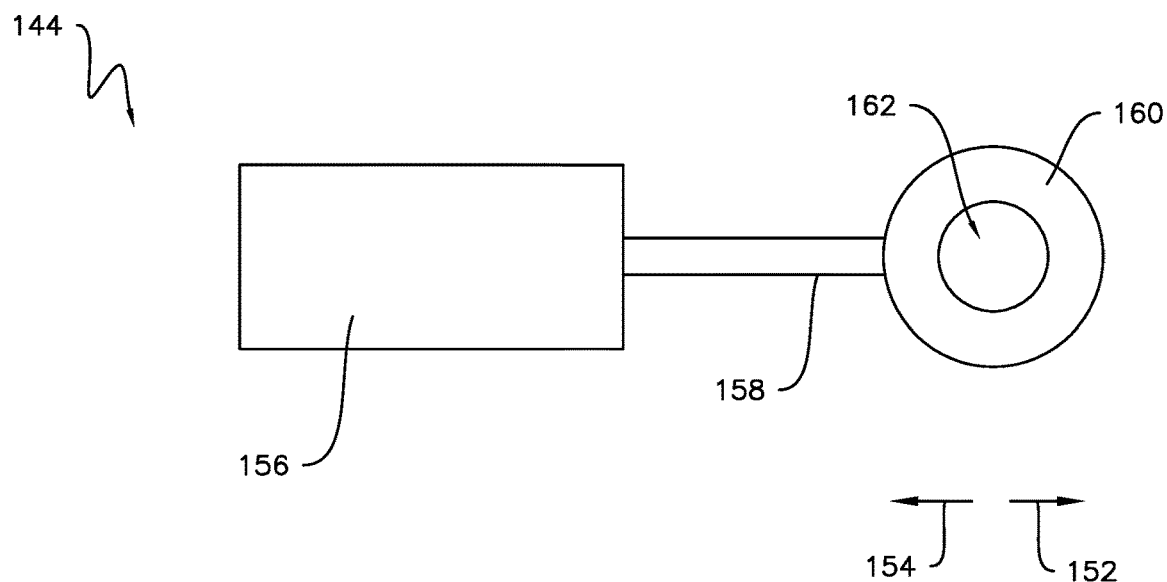
FIG. 9 is a top view of one embodiment of a guide tool in accordance with aspects of the present disclosure.

FIG. 9 illustrates an exemplary embodiment of one of the guide tools 144. As shown, the guide tool 144 includes an actuator 156 (e.g., a solenoid, an electric motor, etc.) coupled to one end of a shank 158 and a ring 160 coupled to the other end of the shank 158. The ring 158 defines an eye 162 through which the corresponding impregnated fiber tow 140 is drawn. As such, the ring 158 constrains the impregnated fiber tow 140 in a plane parallel to the bottom wall 110 of the reservoir 104. In this respect, when the actuator 156 extends (i.e., moves the shank 158 in the direction 152) or retracts (i.e., moves the shank 158 in the direction 154), the guide tool 144 moves the corresponding impregnated fiber tow 140 relative to the build plate 118. Although the eyes 162 of the guide tools 144 are illustrated as receiving only one fiber tow 103, the eyes 162 may receive any number of fiber tows 103, such as two or more fiber tows 103. In embodiments where the eyes 162 receive multiple fiber tows 103, the guide tools 144 may not need to be positioned as close together as guide tools 144 whose eyes 162 receive only one fiber tow 103. In alternative embodiments, however, the guide tool 144 may have any suitable configuration.

Referring again to FIG. 7, the system 100 may further include a controller 164 configured to electronically control the operation of one or more components of the system 100. In general, the controller 164 may correspond to any suitable processor-based device, including one or more computing devices. As shown in FIG. 7, for example, the controller 164 may include one or more processors 166 and one or more associated memory devices 168 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory devices 168 may generally include memory element(s) including, but not limited to, a computer readable medium (e.g., random access memory (RAM)), a computer readable non-volatile medium (e.g., flash memory), a compact disc-read only memory (CD-ROM), a magneto-optical disk (MOD), a digital versatile disc (DVD), and/or other suitable memory elements or combinations thereof. The memory device 168 may store instructions that, when executed by the processor 166, cause the processor 166 to perform various functions, such as one or more aspects of the method 200 described below with reference to FIG. 10. In addition, the controller 164 may also include various other suitable components, such as a communications circuit or module, one or more input/output channels, a data/control bus and/or the like.

In several embodiments, the controller 164 may be configured to control the guide tools 144 to position a portion of the impregnated fiber tows 140 within the build region 130 of the reservoir 104. More specifically, the controller 164 may be communicatively coupled to the guide tools 144 via a wired or wireless connection to permit the transmission of control signals (e.g., indicated by dashed lines 170 in FIG. 7) to the guide tools 144. For example, the control signals 170 may instruct the actuators 156 of the guide tools 144 to move the corresponding shanks 158 in the direction 152 or the direction 154 to position the impregnated fiber tows 140 within the build region 130. In some embodiments, the controller 164 may be configured to determine the location of the build region 130 based on the desired geometry of the fiber-reinforced polymer component 102.

The controller 164 may also be configured to control the radiation source 124 and/or the mirror 128 to irradiate the build region 130 of the reservoir 104. More specifically, the controller 164 may be communicatively coupled to the radiation source 124 via a wired or wireless connection to permit the transmission of control signals (e.g., indicated by dashed lines 172 in FIG. 7) to the radiation source 124. For example, the control signals 172 may instruct the radiation source 124 to emit radiation 126. Furthermore, the controller 164 may be communicatively coupled to the mirror 128 via a wired or wireless connection to permit the transmission of control signals (e.g., indicated by dashed lines 174 in FIG. 7) to the mirror 128. For example, the control signals 174 may instruct the mirror 128 to direct the radiation 126 into the reservoir 104 to irradiate the build region 130. As mentioned above, the controller 164 may be configured to determine the location of the build region 130 within the reservoir 104 based on the desired geometry of the fiber-reinforced polymer component 102.

The controller 164 may further be configured to control an actuator (not shown) associated with the build plate 118 to continuously move the build plate 118 away from the build region 130 and the reservoir 104 as the build region 130 is irradiated. In this respect, moving the polymerized solid 108 out of the build region 130 allows the radiation 126 to irradiate the polymerizable liquid 106 that flows into the build region 130 to replace to polymerized solid 108, thereby forming a subsequent layer of the fiber-reinforced polymer component 102.

Additionally, the controller 164 may configured to adjust the size, shape, and/or location of the build region 130 within the reservoir 104 relative to the build plate 118. As indicated above, the cross-section of the fiber-reinforced polymer component 102 may vary. In this respect, the controller 164 may be configured to control the mirror 128 and/or the guide tools 144 (e.g., via the control signals 170, 174, respectively) such that the irradiated build region 130 and the position of the impregnated fiber tows 140 corresponds to the cross-section of the portion of the fiber-reinforced polymer component 102 currently being formed.

Figure 10:
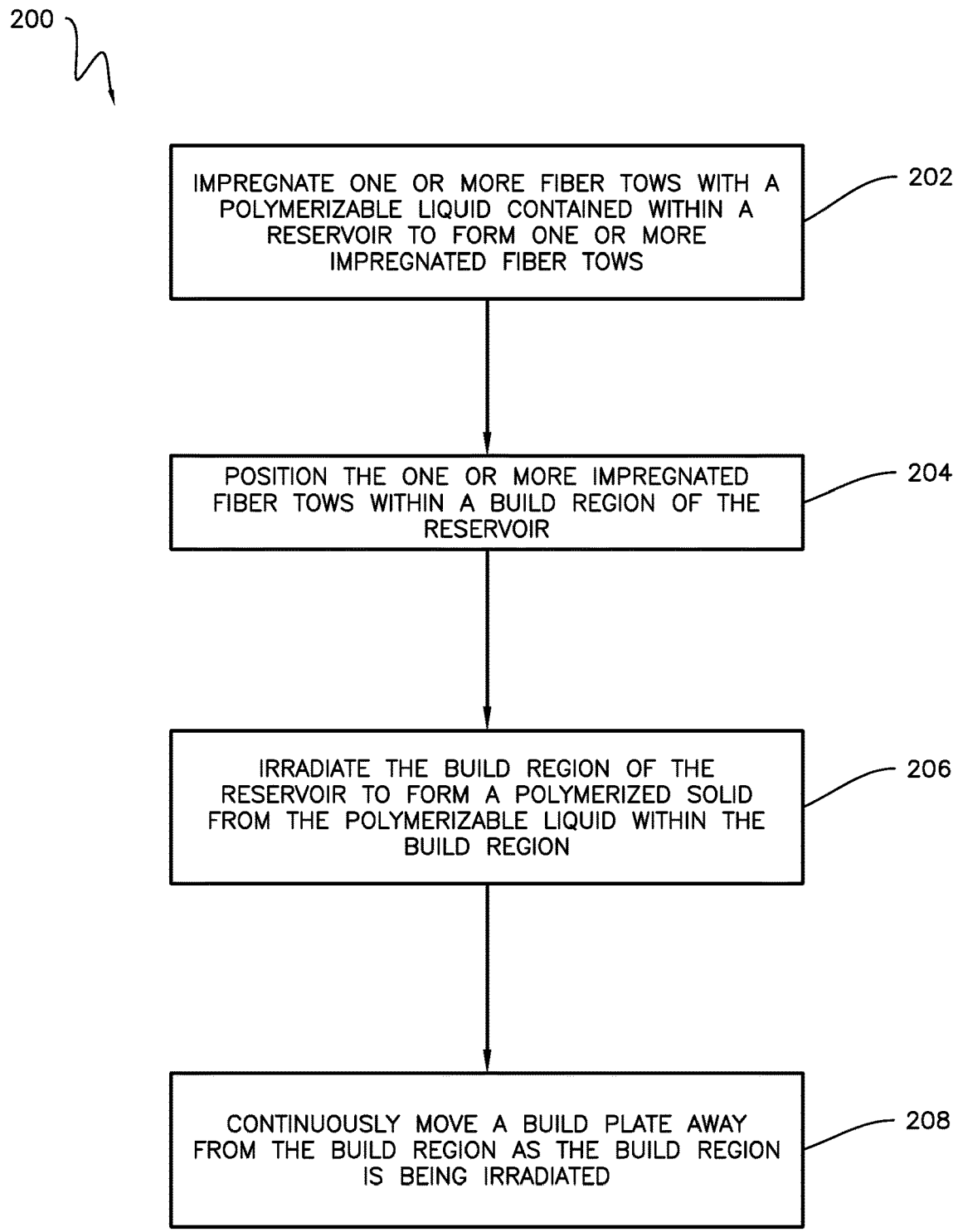
FIG. 10 is a flow chart illustrating of one embodiment of a method for forming a fiber-reinforced polymer component in accordance with aspects of the present disclosure.

FIG. 10 illustrates one embodiment of a method 200 for forming a fiber-reinforced polymer component in accordance with aspects of the present subject matter. Although FIG. 10 depicts steps performed in a particular order for purposes of illustration and discussion, the methods discussed herein are not limited to any particular order or arrangement. As such, the various steps of the methods disclosed herein can be omitted, rearranged, combined, and/or adapted in various ways without deviating from the scope of the present disclosure.

As shown in FIG. 10, at (202), the method 200 may include impregnating a one or more fiber tows with a polymerizable liquid contained within a reservoir to form one or more impregnated fiber tows. For example, the fiber tows 103 may be drawn through the polymerizable liquid 106 within the reservoir 104 prior to entering the build region 130 of the reservoir 104 to form the impregnated fiber tows 140. As mentioned above, various pulleys (e.g., the idler pulleys 138, 142) may direct the fiber tows 103 into and through the polymerized liquid 106.

At (204), the method may include positioning the one or more impregnated fiber tows within a build region of the reservoir. For example, as indicated above, the controller 164 may be communicatively coupled to the guide tools 144, thereby permitting the controller 164 to transmit the control signals 170 to the guide tools 144 instructing the guide tools 144 to position the impregnated fibers tows 140 within the build region 130.

Furthermore, at (206), the method 200 includes irradiating the build region of the reservoir to form a polymerized solid from the polymerizable liquid within the build region. For example, the controller 164 may be communicatively coupled to the radiation source 124, thereby permitting the controller 164 to transmit the control signals 172 to the radiation source 124 instructing the radiation source 124 to emit the radiation 126, such as ultraviolet radiation. Furthermore, the controller 164 may be communicatively coupled to the mirror 128, thereby permitting the controller 164 to transmit the control signals 174 to the mirror 128 instructing the mirror 128 to direct the radiation 126 emitted by the radiation source 124 into the build region 130 of the reservoir. As described above, the radiation 126 polymerizes or otherwise solidifies the polymerizable liquid 106 within the build region 130 to form the polymerized solid 108, which encases the fiber tows 103 to at least partially define the fiber-reinforced polymer component 102.

Additionally, at (208), the method 200 may include continuously moving a build plate away from the build region as the build region is being irradiated. For example, an actuator (not shown) may continuously move the build plate 118 away from the build region 130 and the reservoir 104, such as at a constant speed relative to the reservoir 104, as the build region 130 is irradiated. As indicated above, such continuous movement permits formation of each subsequent layer of the fiber-reinforced polymer component 102.

Unlike conventional systems and methods, the system 100 and the method 200 disclosed herein continuously additively form fiber-reinforced polymer components.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for forming a fiber-reinforced polymer component, the method comprising:
impregnating a first fiber tow with a polymerizable liquid contained within a reservoir to form a first impregnated fiber tow;
positioning the first impregnated fiber tow within a build region of the reservoir, the build region having a shape and size corresponding to a cross-section of the fiber-reinforced polymer component;
irradiating the build region of the reservoir to form a polymerized solid from the polymerizable liquid within the build region, the polymerized solid encasing a portion of the first fiber tow to form at least a portion of the fiber-reinforced polymer component; and,
adjusting at least one of a shape, a size, or a position of the build region as the cross-section of the fiber-reinforced polymer component changes.

2. The method of claim 1, further comprising:
adjusting a position of the first fiber tow as the cross-section of the fiber-reinforced polymer component changes.

3. The method of claim 2, wherein adjusting the position of the first fiber tow comprises adjusting the position of the first fiber tow with a guide tool positioned within a dead zone of the reservoir, the dead zone being positioned between a bottom wall of the reservoir and the build region, the dead zone containing oxygen for preventing polymerization of the polymerizable liquid.

4. The method of claim 1, further comprising:
impregnating a second fiber tow with the polymerizable liquid contained within the reservoir to form a second impregnated fiber tow; and,
positioning the second impregnated fiber tow within the build region of the reservoir, the second impregnated fiber tow being position in a different portion of the build region than the first fiber tow.

5. The method of claim 1, further comprising:
supplying oxygen to the reservoir through an oxygen-permeable portion of the reservoir to create a dead zone within the reservoir, the dead zone being positioned between a bottom wall of the reservoir and the build region, the oxygen preventing polymerization of the polymerizable liquid.

6. The method of claim 1, wherein irradiating the build region comprises directing radiation into the build region of the reservoir with a mirror.

7. The method of claim 1, wherein the polymerized solid is coupled to a build plate.

8. The method of claim 7, further comprising:
continuously moving the build plate away from the build region as the build region is irradiated.

9. The method of claim 1, wherein irradiating the build region comprises irradiating the build region with ultraviolet radiation.

10. The method of claim 1, wherein the fiber-reinforced polymer component is a continuous fiber-reinforced polymer component.

11. The method of claim 1, wherein the first fiber tow comprises a plurality of carbon or glass fibers.

12. The method of claim 1, wherein the fiber-reinforced polymer component is a wind turbine component.

13. The method of claim 12, wherein the wind turbine component is a shear web.

14. A method for forming a lattice portion of a continuous fiber-reinforced polymeric wind turbine component, the method comprising:
impregnating first and second fiber tows with a polymerizable liquid contained within a reservoir to form first and second impregnated fiber tows;

positioning the first and second impregnated fiber tows within a build region of the reservoir, the first fiber tow being positioned at a different location within the build region than the second fiber tow, the build region having a shape and size corresponding to a cross-section of the lattice portion of the fiber-reinforced polymeric wind turbine component;

irradiating the build region of the reservoir to form a polymerized solid from the polymerizable liquid within the build region, the polymerized solid being coupled to a build plate, the polymerized solid encasing a portion of the first and second fiber tows to form at least a portion of the lattice portion of the fiber-reinforced polymeric wind turbine component;

continuously moving the build plate away from the build region when the build region is irradiated; and, adjusting at least one of a shape or a size of the build region when the cross-section of the lattice portion of the fiber-reinforced polymeric wind turbine being forced changes.

15. The method of claim 14, further comprising:

adjusting the positions of the first and second fiber tows as the cross-section of the continuous fiber-reinforced polymeric wind turbine component changes.

16. The method of claim 15, wherein adjusting the position of the first and second fiber tows comprises adjusting the position of the first fiber tow with a first guide tool and adjusting the position of the second fiber tow with a second guide tool, the first and second guide tools being positioned within a dead zone of the reservoir, the dead zone being positioned between a bottom wall of the reservoir and the build region, the dead zone containing oxygen for preventing polymerization of the polymerizable liquid.

17. The method of claim 14, wherein the continuous fiber-reinforced polymeric wind turbine component is a shear web.

* * * * *